3,026,311
OLEFIN POLYMERIZATION USING CATALYSTS CONTAINING ORGANIC SULFUR COMPOUNDS
Harry W. Coover, Jr., and Frederick B. Joyner, Kingsport, Tenn., assignors to Eastman Kodak Company, Rochester, N.Y., a corporation of New Jersey
No Drawing. Filed Aug. 14, 1959, Ser. No. 833,675
13 Claims. (Cl. 260—93.7)

This invention relates to a new and improved process for the polymerization of olefinic hydrocarbons. In one aspect, this invention relates to a novel catalyst combination for preparing high molecular weight, solid polyolefins, such as polypropylene of high density and crystallinity. In another aspect, this invention relates to the preparation of polymers of propylene and its higher homologs using a particular catalyst combination which has unexpected catalytic activity and which results in polymeric products characterized by unusually high crystallinity.

Polyethylene has been prepared by high pressure procedures to produce relatively flexible polymers having a rather high degree of chain branching and a density considerably lower than the theoretical density. Thus, pressures of the order of 500 atmospheres and higher and usually of the order of 1,000 to 1,500 atmospheres are commonly employed in such procedures. It has been found that more dense polyethylene can be produced with certain catalyst combinations to give polymers which have relatively little chain branching and a high degree of crystallinity. The exact reason why certain catalyst combinations give these polymers of high density and high crystallinity is not fully understood. Furthermore, the activity of the catalysts ordinarily depends upon certain specific catalyst combinations, and the results are ordinarily highly unpredictable since relatively minor changes in the catalyst combination often lead to liquid polymers rather than the desired solid polymers.

Among the catalysts that have been employed to polymerize ethylene to solid crystalline polymers are combinations that include organo-aluminum compounds, such as trialkyl aluminum compounds and alkyl aluminum halide compounds in conjunction with certain inorganic halides. Thus, triethyl aluminum in conjunction with titanium tri- or tetrachloride catalyzes a polymerization reaction for the production of crystalline polyethylene. Similarly, catalytic mixtures of ethyl aluminum sesquichloride in conjunction with titanium trichloride can be used to polymerize ethylene to solid crystalline polymer. However, when catalytic mixtures of ethyl aluminum sesquichloride and titanium trichloride are employed to polymerize propylene the product is predominantly polymeric oils and rubbers with a comparatively small amount of high molecular weight crystalline product being formed. When a mixture of ethyl aluminum sesquichloride and titanium trichloride are employed to polymerize propylene at a comparatively low pressure, the mixture does not act as a catalyst, and substantially no polymer is formed.

Some of the catalytic mixtures that are effective for producing polyethylene cannot be used to produce crystalline, high density polypropylene. Thus, one cannot predict whether a specific catalyst combination will be effective to produce crystalline, high-density polymers with specific olefinic hydrocarbons.

It is an object of this invention to provide an improved process for the polymerization of α-monoolefinic hydrocarbons to form solid, high density, crystalline products.

It is another object of this invention to provide an improved process for the polymerization of propylene and higher α-monoolefinic hydrocarbons to produce solid, high density, crystalline products.

It is another object of this invention to provide novel catalyst combinations which have unexpected catalytic activity for the polymerization of α-monoolefinic hydrocarbons to form crystalline high density polymers. Other objects of this invention will be readily apparent from the detailed disclosure.

The above and other objects of this invention are accomplished by means of this invention wherein α-monoolefinic hydrocarbons either singly or in admixture are readily polymerized to high molecular weight, solid, crystalline polymers by effecting the polymerization in the presence of a catalyst composition comprising (1) a compound selected from the group consisting of halides and lower alkoxides of a transition metal selected from the group consisting of titanium, zirconium, vanadium, chromium and molybdenum (2) an organic sulfur compound having one of the following formulas: $(R)_2SO_n$, $(R)_2NSO_2R$ and $(R)_2S(O)NH$ wherein R is a hydrocarbon radical selected from the group consisting of alkyl radicals containing 1 to 8 carbon atoms, phenyl and lower alkyl phenyl and $n$ is an integer of 1 to 4 and (3) at least one component selected from the following: (a) a metal from groups IA, II and IIIA of the periodic table, alkyl and hydride derivatives of the metals in groups IA, II and IIIA of the periodic table and complex metal hydrides of aluminum and alkali metal; (b) organo-aluminum halides having the formula $R_mAlX_n$ and 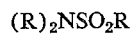 wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide.

The transition metal compounds of our catalyst system comprise the alkoxides, alkoxyhalides, and halides, such as iodides, chlorides or bromides of a transition metal selected from the group consisting of titanium, vanadium, zirconium, chromium and molybdenum. The transition metal compounds can be used at their maximum valence, and if desired, a reduced valency form of the compound can be employed. It is preferred to use the titanium chlorides which may be in the form of titanium tetrachloride, titanium trichloride and titanium dichloride. Examples of other metal halides and alkoxides that can be employed are titanium tetrabromide, titanium tribromide, zirconium tetrachloride, zirconium tribromide, vanadium trichloride, molybdenum pentachloride, chromium tribromide, titanium tetrabutoxide, vanadium triethoxide, titanium tetraoctoxide, dichlorotitanium dibutoxide, and the like.

The catalytic mixture employed in practicing our invention also contains an organic sulfur compound. Among the organic sulfur compounds that can be used are the sulfoxides, sulfones, sulfates, sulfonates, sulfonamides, sulfoximines, and the like. Specific organic sulfur compounds that can be used are dimethyl sulfoxide, dimethyl sulfone, diethyl sulfate, N,N-dimethylbenzene sulfonamide, dimethyl sulfoximine, diphenyl sulfoxide, ethyl benzene sulfonate, dihexyl sulfoximine, dibutyl sulfoxide, dioctyl sulfone, diphenyl sulfate, N,N-dipropyl benzene sulfonamide, diethyl sulfoxide, and the like.

In addition to the transition metal compounds and the organic sulfur compounds our catalyst composition contains another component which can be a metal, such as sodium, potassium, lithium, magnesium, zinc, aluminum and the like. The catalyst can also contain certain alkyl and hydride derivatives of these metals; for example, sodium amyl, potassium butyl, lithium propyl, aluminum triethyl, aluminum tripropyl, aluminum tributyl, zinc dibutyl, zinc diamyl, zinc dipropyl, ethyl magnesium bromide, sodium hydride, calcium hydride, lithium aluminum hydride, and the like can be employed as components of our catalyst mixture. Also, the catalyst composition may contain an organo-aluminum compound, such as ethyl aluminum dichloride, cyclohexyl aluminum dichloride, cyclobutyl aluminum dibromide, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride, and the like. Additionally, our catalyst composition can contain the polymeric reaction product of aluminum and a methylene halide, such as methylene dichloride as described in the copending application, Serial No. 549,868, filed November 29, 1955. The polymeric reaction product that can be used in our catalyst composition can be obtained by reacting a methylene halide, such as methylene bromide or methylene chloride, with aluminum, and the product is a complex polymeric material whose structure is not readily definable.

The inventive process is carried out in liquid phase in an inert organic liquid and preferably an inert liquid hydrocarbon vehicle, but the process can be carried out in the absence of an inert diluent. The process proceeds with excellent results over a temperature range of from 50° C. to 250° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing ethylene and mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are quite useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The limiting factor in the temperature of the process appears to be the decomposition temperature of the catalyst. Ordinarily temperatures from 50° C. to 150° C. are employed, although temperatures as high as 250° C. can be employed if desired. Usually, it is not desirable or economical to effect the polymerization at temperatures below 50° C., and the process can be readily controlled at temperatures not substantially above room temperature which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution.

The preferred molar ratio of component 3 to transition metal compound in our catalyst is within the range of 1:0.5 to 1:2, and the preferred molar ratio of component 3 to organic sulfur compound in our catalyst is within the range of 10:1 to 1:5, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzine, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well-known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

*Example 1*

Inside a nitrogen-filled dry box the following materials were placed into a dry, 500-ml. pressure bottle; 100 ml. of dry heptane and 3 g. of a catalyst mixture which comprised a 2:3:1 molar ratio of ethylaluminum sesquichloride, titanium trichloride, and dimethylsulfoxide. The pressure bottle was removed from the dry box, attached to a source of propylene, and shaking was initiated. The bottle and its contents were heated to 75° C. under 30 p.s.i. propylene pressure and maintained there for a total of 6 hours. The reaction bottle was detached then from the shaking apparatus and dry methanol was added to the mixture to destroy the catalyst. The polymeric product was washed with hot, dry isobutanol to further remove catalyst residues. A total of 12.3 g. of highly crystalline polypropylene was obtained in this manner, the inherent viscosity of the product being 4.6.

In another run using ethylaluminum sesquichloride and titanium trichloride without the dimethylsulfoxide, no polypropylene was formed under the above conditions.

*Example 2*

Inside a nitrogen-filled dry box the following materials were placed into a 285-ml. stainless steel autoclave: 100 ml. of dry mineral spirits (B.P. 197° C.), a total of 2 g. of 2:3:5 molar ratio of ethylaluminum sesquichloride, titanium trichloride and dimethylsulfone. The autoclave was then placed in a rocker attached to a source of liquid propylene and 100 ml. of anhydrous liquid propylene monomer was added. Rocking was initiated and the mixture was heated to 85° C. and maintained there during a polymerization period of 6 hours. The polymer was worked up as described in Example 1 to form a 41.5-g. yield of highly crystalline polypropylene of inherent viscosity 5.1. When hydrogen was admitted to the polymerization vessel and maintained there at 50 p.s.i. partial pressure, the inherent viscosity of the product was reduced to 2.7. An increase in the hydrogen pressure to 500 p.s.i. in a similar run produced a very low molecular weight crystalline polypropylene of inherent viscosity 0.37.

*Example 3*

The procedure of Example 2 was used to polymerize propylene with no solvent present. 100 g. of propylene monomer was used and within the 6-hr. polymerization period at 85° C., a 97.2-g. yield of highly crystalline polypropylene of inherent viscosity 5.3 was obtained.

*Example 4*

The procedure of Example 2 was employed to polymerize a 50-g. charge of 3-methyl-1-butene using 3 g. total catalyst made up of a 2:2:1 molar ratio of ethylaluminum sesquichloride, vanadium trichloride, and ethyl sulfate. A 23.7-g. yield of highly crystalline poly(3-methyl-1-butene) was obtained of inherent viscosity 2.3.

*Example 5*

The procedure of Example 2 was used to polymerize a 50-g. charge of styrene using 3 g. total catalyst and a 1:1:3 molar ratio of ethylaluminum sesquibromide, vanadium trichloride and N,N-dimethylbenzenesulfonamide. A 32.1-g. yield of highly crystalline polystyrene was obtained having an inherent viscosity of 2.4.

*Example 6*

The procedure of Example 2 was employed to polymerize allylbenzene using 2:1:3 molar ratio of cyclohexylaluminum sesquichloride, zirconium tetrachloride, and dimethyl sulfoximine. A 14.3-g. yield of highly crystalline poly(allylbenzene) was obtained.

*Example 7*

The procedure of Example 2 was employed to polymerize vinylcyclohexane using 2 g. total catalyst comprising a 1:1:1 molar ratio of phenylaluminum sesquichloride, molybdenum pentachloride and diphenyl sulfoxide. A 31.7-g. yield of highly crystalline poly(vinylcyclohexane) of inherent viscosity 2.3 was obtained.

*Example 8*

The procedure of Example 2 was employed to polymerize butadiene using a 2:3:2 molar ratio of tolylaluminum sesquichloride, titanium trichloride and ethyl benzenesulfonate. From 50 g. of butadiene monomer, a 26.1-g. yield of polybutadiene of inherent viscosity 2.1 was obtained. Similar results are obtained by using either titanium tetrabutoxide or vanadium tribromide in place of the titanium trichloride above.

*Example 9*

Inside a nitrogen-filled dry box, the following materials were placed into a dry, 500-ml. pressure bottle: 100 ml. of dry heptane and 3 g. of a catalyst mixture which comprised a 2:2:1 molar ratio of ethylaluminum dichloride, titanium trichloride, and dimethyl sulfoxide. The pressure bottle was removed from the dry box, attached to a Parr hydrogenation apparatus in which propylene was being used in place of hydrogen, and shaking was initiated. The bottle and its contents were heated to 75° C. under 30 p.s.i. propylene pressure and maintained under these conditions for a total of 6 hours. The reaction vessel was detached then from the shaking apparatus, dry isobutyl alcohol was added to deactivate the catalyst, and then the polymer was washed with hot, dry isobutanol to remove the catalyst residues. A total of 11.4 g. of highly crystalline polypropylene was obtained having an inherent viscosity in tetralin at 145° C. of 1.91 and a density of 0.919.

In another run using only the ethylaluminum dichloride and the titanium trichloride, omitting the dimethyl sulfoxide, no solid polypropylene was formed under the above conditions.

*Example 10*

Inside a nitrogen-filled dry box, the following materials were placed into a 285-ml. stainless steel autoclave: 100 ml. of dry mineral spirits (B.P. 197° C.) and a total of 2 g. of a 1:1:0.25 molar ratio of ethylaluminum dibromide, titanium trichloride and diphenyl sulfoxide. The autoclave was then placed in a rocker attached to a source of liquid propylene and 100 ml. of anhydrous liquid propylene monomer was added. Rocking was initiated and the mixture was heated to 85° C. and maintained at this temperature during a polymerization period of 6 hours. The polymer was worked up as described in Example 9 to give a yield of 30 g. of highly crystalline polypropylene having an inherent viscosity of 2.99 in tetralin at 145° C. When hydrogen was admitted to the polymerization vessel and was maintained there at 50 p.s.i. partial pressure, the inherent viscosity of the product was 1.70. An increase in the hydrogen pressure to 500 p.s.i. in a similar run produced a very low molecular-weight crystalline polypropylene of inherent viscosity 0.31.

*Example 11*

The procedure of Example 10 was used to polymerize propylene with no solvent present. One hundred grams of propylene monomer was used and within the 6-hour polymerization period at 85° C., a 60.5-g. yield of highly crystalline polypropylene of inherent viscosity 3.33 was obtained.

*Example 12*

The procedure of Example 10 was employed to polymerize a 50-g. charge of 3-methyl-1-butene using 3 g. of catalyst made up of ethylaluminum dichloride, zirconium tetrachloride and dimethyl sulfone in a molar ratio of 2:1:1. The yield was 34 g. of highly crystalline poly(3-methyl-1-butene) having an inherent viscosity of 2.21 and a crystalline melting point of 238–243° C.

*Example 13*

The procedure of Example 10 was used to polymerize a 50-g. charge of styrene using 1 g. of catalyst comprised of ethylaluminum dichloride, vanadium trichloride and dimethyl sulfoximine in a 1:3:1 molar ratio. A 39-g. yield of crystalline polystyrene was obtained. This polymer had an inherent viscosity of 3.06 and a crystalline melting point of 234–242° C.

*Example 14*

The procedure of Example 10 was employed to polymerize allylbenzene using 2 g. of a catalyst comprised of ethylaluminum dibromide, chromium trichloride and diethyl sulfate in a 1:1:1 molar ratio. The yield of crystalline poly(allylbenzene) was 45%.

*Example 15*

The procedure of Example 10 was employed to polymerize vinylcyclohexane using 2 g. of catalyst composed of a 2:1:3 molar ratio of ethylaluminum dichloride, molybdenum pentachloride and ethyl benzenesulfonate. A 29% yield of highly crystalline poly(vinylcyclohexane) having an inherent viscosity of 1.77 was obtained.

*Example 16*

The procedure of Example 10 was employed to polymerize butadiene using a 2:2:1 molar ratio of ethylaluminum dichloride, titanium tribromide and N,N-dimethylbenzenesulfonamide. From 50 g. of butadiene monomer, a 41-g. yield of polybutadiene of inherent viscosity 1.87 was obtained.

*Example 17*

In a nitrogen-filled dry box, a 7-oz., tapered pressure bottle was charged in order with 40 ml. of dry benzene, 20 g. of 4-methyl-1-pentene and 1 g. of a catalyst consisting of ethylaluminum dichloride, titanium trichloride and dihexyl sulfoximine in a molar ratio of 1:3:2. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 12.5 g. and melted at 201–205° C.

*Example 18*

In a nitrogen-filled dry box, a total of 2 g. of catalyst was added to a 500-ml. pressure bottle containing 100 ml. of dry heptane. The catalyst was made up of an $$Al—CH_2Br_2$$

reaction product, titanium tetrachloride and dimethyl sulfoximine in a molar ratio of 1:1:1. The pressure bottle was then attached to a source of propylene, and the reaction mixture was agitated, heated to 75° C. and maintained under 30 p.s.i. propylene pressure for 6 hours. At the end of this time, the bottle was removed from the propylene source, dry isobutanol was added to deactivate the catalyst, and then the polymer was washed with hot, dry isobutanol to remove the catalyst residues. The yield of highly crystalline polypropylene was 25 g. This polymer had an inherent viscosity in tetralin at 145° C. of 2.00 and a density of 0.913.

In another run using only the Al—CH_2Br_2 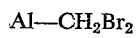 reaction product and titanium tetrachloride omitting the dimethyl sulfoximine, no solid polypropylene was formed under the above conditions.

*Example 19*

Inside a nitrogen-filled dry box, a 285-ml. stainless steel autoclave was loaded with 2 g. of a catalyst comprising a 3:4:2 molar ratio of an Al—CH_2Br_2 reaction product, titanium trichloride, and dimethyl sulfoxide and 100 ml. of dry mineral spirits (B.P. 197° C.). The autoclave was sealed, placed in a rocker, and 100 ml. (51 g.) of dry, liquid propylene was added. Rocking was initiated, and the mixture was heated to 85° C. and maintained at this temperature for 6 hours. The polymer was worked up as described in Example 18 to give a yield of 34 g. of highly crystalline polypropylene having an inherent viscosity of 2.80 in tetralin at 145° C. When hydrogen was admitted to the polymerization vessel and was maintained there at 50 p.s.i. partial pressure, the inherent viscosity of the product was 1.69. An increase in the hydrogen pressure to 500 p.s.i. in a similar run produced a very low-molecular-weight crystalline polypropylene of inherent viscosity 0.39.

*Example 20*

The procedure of Example 19 was used to polymerize propylene with no solvent present. One hundred grams of liquid propylene monomer was used and within the 6-hr. reaction period at 85° C., a 77.5-g. yield of highly crystalline polypropylene of inherent viscosity 3.04 was obtained.

*Example 21*

The procedure of Example 19 was employed to polymerize a 50-g. charge of 3-methyl-1-butene using 3 g. of catalyst made up of an Al—CH_2Br_2 reaction product, zirconium tetrachloride and diphenyl sulfoxide in a molar ratio of 1:2:2. The yield was 25 g. of highly crystalline poly(3-methyl-1-butene) having an inherent viscosity of 1.92 and a crystalline melting point of 238–244° C.

*Example 22*

The procedure of Example 19 was used to polymerize a 50-g. charge of styrene using 0.75 g. of catalyst comprised of an Al—$CH_2Br_2$ reaction product, vanadium trichloride and dimethyl sulfone in a 1:2:1 molar ratio. A 35-g. yield of crystalline polystyrene was obtained. This polymer had an inherent viscosity of 2.88 and a crystalline melting point of 233–240° C.

*Example 23*

The procedure of Example 19 was employed to polymerize allylbenzene using 2 g. of a catalyst comprised of an Al—$CH_2Br_2$ reaction product, chromium tribromide and diethyl sulfate in a 1:1:0.25 molar ratio. The yield of crystalline poly(allylbenzene) was 55%.

*Example 24*

The procedure of Example 19 was employed to polymerize vinylcyclohexane using 2 g. of catalyst composed of a 1:1:2 molar ratio of an Al—$CH_2Br_2$ reaction product, molybdenum pentachloride and ethyl benzenesulfonate. A 30% yield of highly crystalline poly(vinylcyclohexane) having an inherent viscosity of 1.40 was obtained.

*Example 25*

The procedure of Example 19 was employed to polymerize butadiene using a 1:2:2 molar ratio of an

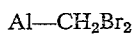

Al—$CH_2Br_2$ reaction product, titanium tetraiodide and N,N-dimethylbenzenesulfonamide. From 50 g. of butadiene monomer, a 33.5-g. yield of polybutadiene of inherent viscosity 1.81 was obtained.

*Example 26*

In a nitrogen-filled dry box, a 7-oz. tapered pressure bottle was charged in order with 40 ml. of dry benzene, 20 g. of 4-methyl-1-pentene and 1 g. of a catalyst consisting of an Al—$CH_2Br_2$ reaction product, vanadium trichloride and dihexyl sulfoximine in a molar ratio of 1:2:1. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 13.5 g. and melted at 200–205° C.

*Example 27*

In a nitrogen-filled dry box, a total of 2 g. of catalyst was added to a 500-ml. pressure bottle containing 100 ml. of dry heptane. The catalyst was made up of phenylmagnesium bromide, titanium tetrachloride and dimethyl sulfoxide in a molar ratio of 2:2:1. The pressure bottle was then attached to a source of propylene, and the reaction mixture was agitated, heated to 75° C. and maintained under 30 p.s.i. propylene pressure for 6 hours. At the end of this time, the bottle was removed from the propylene source, dry isobutanol was added to deactivate the catalyst, and then the polymer was washed with hot, dry isobutanol to remove the catalyst residues. The yield of highly crystalline polypropylene was 14.2 g. This polymer had an inherent viscosity in tetralin at 145° C. of 2.31 and a density of 0.918.

In another run using only the phenylmagnesium bromide and titanium tetrachloride omitting the dimethyl sulfoxide, little or no crystalline polypropylene was formed under the above conditions.

*Example 28*

Inside a nitrogen-filled dry box, a 285-ml. stainless steel autoclave was loaded with 2 g. of a catalyst comprising a 1:1:0.25 molar ratio of triethylaluminum, titanium tetrachloride and dimethyl sulfoximine and 100 ml. of dry mineral spirits (B.P. 197° C.). The autoclave was sealed, placed in a rocker, and 100 ml. (51 g.) of dry, liquid propylene was added. Rocking was initiated, and the mixture was heated to 85° C. and maintained at this temperature for 6 hours. The polymer was worked up as described in Example 27 to give a yield of 38 g. of highly crystalline polypropylene having an inherent viscosity of 2.95 in tetralin at 145° C. When hydrogen was admitted to the polymerization vessel and was maintained there at 50 p.s.i. partial pressure, the inherent viscosity of the product was 1.89. An increase in the hydrogen pressure to 500 p.s.i. in a similar run produced a very low-molecular-weight crystalline polypropylene of inherent viscosity 0.31.

*Example 29*

The procedure of Example 28 was used to polymerize propylene with no solvent present. One hundred grams of liquid propylene monomer was used and within the 6-hr. reaction period at 85° C., a 75-g. yield of highly crystalline polypropylene of inherent viscosity 3.33 was obtained.

*Example 30*

The procedure of Example 28 was employed to polymerize a 50-g. charge of 3-methyl-1-butene using 3 g. of catalyst made up of lithium aluminum hydride, vanadium tetrachloride and diphenyl sulfoxide in a molar ratio of 1:1:0.1. The yield was 24.5 g. of highly crystalline poly-(3-methyl-1-butene) having an inherent viscosity of 2.09 and a crystalline melting point of 237–242° C.

*Example 31*

The procedure of Example 28 was used to polymerize a 50-g. charge of styrene using 0.75 g. of catalyst comprised of amylsodium, titanium tetrabutoxide and dimethyl sulfone in a 1:2:2 molar ratio. A 17-g. yield of crystalline polystyrene was obtained. This polymer had an inherent viscosity of 2.92 and a crystalline melting point of 232–239° C.

*Example 32*

The procedure of Example 28 was employed to polymerize allylbenzene using 2 g. of a catalyst comprised of diethylzinc, zirconium tetrachloride and diethyl sulfate in a 1:2:1 molar ratio. The yield of crystalline poly-(allylbenzene) was 48%.

*Example 33*

The procedure of Example 28 was employed to polymerize vinylcyclohexane using 2 g. of catalyst composed of a 2:2:1 molar ratio of lithium aluminum tetraphenyl, chromium tribromide and ethyl benzenesulfonate. A 40% yield of highly crystalline poly(vinylcyclohexane) having an inherent viscosity of 1.35 was obtained.

*Example 34*

The procedure of Example 28 was employed to polymerize butadiene using a 1:3:1 molar ratio of sodium hydride, molybdenum pentachloride and dihexyl sulfoximine. From 50 g. of butadiene monomer, a 21-g. yield of polybutadiene of inherent viscosity 1.62 was obtained.

*Example 35*

In a nitrogen-filled dry box, a 7-oz. tapered pressure bottle was charged in order with 40 ml. of dry benzene, 20 g. of 4-methyl-1-pentene and 1 g. of a catalyst consisting of triethylaluminum, titanium tetraiodide and N,N-dimethylbenzenesulfonamide in a molar ratio of 1:1:1. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 16.1 g. and melted at 200–205° C.

*Example 36*

Inside a nitrogen-filled dry box the following materials were placed into a dry, 500-ml. pressure bottle: 100 ml. of dry heptane and 3 g. of a catalyst mixture which comprised a 1:1:0.25 molar ratio of sodium (dispersion), titanium tetrachloride and diphenyl sulfoxide. The pressure bottle was removed from the dry box, attached to a source of propylene, and shaking was initiated. The bottle and its contents were heated to 75° C. under 30 p.s.i. propylene pressure and maintained under these conditions for a total of 6 hours. The reaction vessel was detached then from the shaking apparatus, dry isobutanol was added to deactivate the catalyst, and then the polymer was washed with hot, dry isobutanol to remove the catalyst residues. A total of 7.9 g. of highly crystalline polypropylene was obtained having an inherent viscosity in tetralin at 145° C. of 2.41 and a density of 0.915.

In another run using only the sodium and titanium tetrachloride, omitting the diphenyl sulfoxide, no solid polypropylene was formed under the above conditions.

*Example 37*

Inside a nitrogen-filled dry box the following materials were placed into a 285-ml. stainless steel autoclave: 100 ml. of dry mineral spirits (B.P. 197° C.), a total of 2 g. of 1:1:0.25 molar ratio of potassium metal, titanium tetraiodide, and dimethyl sulfoxide. The autoclave was then placed in a rocker attached to a source of liquid propylene and 100 ml. of anhydrous liquid propylene monomer was added. Rocking was initiated and the mixture was heated to 85° C. and maintained at this temperature during a polymerization period of 6 hours. The polymer was worked up as described in Example 36 to give a yield of 10.3 g. of highly crystalline polypropylene having an inherent viscosity of 2.72 in tetralin at 145° C. When hydrogen was admitted to the polymerization vessel and was maintained there at 50 p.s.i. partial pressure, the inherent viscosity of the product was 1.80. An increase in the hydrogen pressure to 500 p.s.i. in a similar run produced a very low-molecular-weight crystalline polypropylene of inherent viscosity 0.27.

*Example 38*

The procedure of Example 37 was used to polymerize propylene with no solvent present. One hundred grams of propylene monomer was used and within the 6-hr. polymerization period at 85° C., a 16.2-g. yield of highly crystalline polypropylene of inherent viscosity 3.09 was obtained.

*Example 39*

The procedure of Example 37 was employed to polymerize a 50-g. charge of 3-methyl-1-butene using 3 g. of catalyst made up of lithium metal, vanadium tetrachloride and N,N-dimethylbenzenesulfonamide in a molar ratio of 1:1:0.1. The yield was 19 g. of highly crystalline poly(3-methyl-1-butene) having an inherent viscosity of 1.50 and a crystalline melting point of 238–242° C.

*Example 40*

The procedure of Example 37 was used to polymerize a 50-g. charge of styrene using 1 g. of catalyst comprised of magnesium metal, vanadium tetrachloride and dimethyl sulfoximine in a 1:2:2 molar ratio. A 23-g. yield of crystalline polystyrene was obtained. This polymer had an inherent viscosity of 2.33 and a crystalline melting point of 224–235° C.

*Example 41*

The procedure of Example 37 was employed to polymerize allylbenzene using 2 g. of a catalyst comprised of zinc metal, zirconium tetrachloride and dimethyl sulfone in a 1:2:1 molar ratio. The yield of crystalline poly(allylbenzene) was 25%.

*Example 42*

The procedure of Example 37 was employed to polymerize vinylcyclohexane using 2 g. of catalyst composed of a 2:2:1 molar ratio of potassium metal, molybdenum pentachloride and diethyl sulfate. A 17% yield of highly crystalline poly(vinylcyclohexane) having an inherent viscosity of 1.44 was obtained.

*Example 43*

The procedure of Example 37 was employed to polymerize butadiene using a 1:2:0.5 molar ratio of sodium metal, chromium tribromide and ethyl benzenesulfonate. From 50 g. of butadiene monomer, a 35-g. yield of polybutadiene of inherent viscosity 1.62 was obtained.

*Example 44*

In a nitrogen-filled dry box, a 7-oz. tapered pressure bottle was charged in order with 40 ml. of dry benzene, 20 g. of 4-methyl-1-pentene and 1 g. of a catalyst consisting of magnesium metal, titanium tetrachloride and dihexyl sulfoximine in a molar ratio of 1:1:2. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 3.7 g. and melted at 200–205° C.

*Example 45*

Inside a nitrogen-filled dry box the following materials were placed into a dry, 500-ml. pressure bottle: 100 ml. of dry heptane and 3 g. of a catalyst mixture which comprised a 1:3:2 molar ratio of aluminum powder, titanium tetrachloride and dimethyl sulfoxide. The pressure bottle was removed from the dry box, attached to a source of propylene, and shaking was initiated. The bottle and its contents were heated to 75° C. under 30 p.s.i. propylene pressure and maintained under these conditions for a total of 6 hours. The reaction vessel was detached then from the shaking apparatus, dry isobutanol was added to deactivate the catalyst, and then the polymer was washed with hot, dry isobutanol to remove the catalyst residues. A total of 6.3 g. of highly crystalline polypropylene was obtained having an inherent viscosity in tetralin at 145° C. of 1.66 and a density of 0.911.

In another run using only the aluminum powder and the titanium tetrachloride omitting the dimethyl sulfoxide, no solid polypropylene was formed under the above conditions.

*Example 46*

Inside a nitrogen-filled dry box the following materials were placed into a 285-ml. stainless steel autoclave: 100 ml. of dry mineral spirits (B.P. 197° C.), a total of 2 g. of a 2:3:2 molar ratio of aluminum powder, titanium tetrachloride and diphenyl sulfoxide. The autoclave was then placed in a rocker attached to a source of liquid propylene and 100 ml. of anhydrous liquid propylene monomer was added. Rocking was initiated and the mixture was heated to 85° C. and maintained at this temperature during a polymerization period of 6 hours. The polymer was worked up as described in Example 45 to give a yield of 14 g. of highly crystalline polypropylene having an inherent viscosity of 2.01 in tetralin at 145° C. When hydrogen was admitted to the polymerization vessel and was maintained there at 50 p.s.i. partial pressure, the inherent viscosity of the product was 1.06. An increase in the hydrogen pressure to 500 p.s.i. in a similar run produced a very low-molecular-weight crystalline polypropylene of inherent viscosity 0.33.

*Example 47*

The procedure of Example 46 was used to polymerize propylene with no solvent present. One hundred grams of propylene monomer was used and within the 6-hr. polymerization period at 85° C., a 22-g. yield of highly crystalline polypropylene of inherent viscosity 2.45 was obtained.

*Example 48*

The procedure of Example 46 was employed to polymerize a 50-g. charge of 3-methyl-1-butene using 3 g. of catalyst made up of aluminum, titanium tetrachloride and dimethyl sulfone in a molar ratio of 1:1:1. The yield was 7.5 g. of highly crystalline poly(3-methyl-1-butene) having an inherent viscosity of 1.21 and a crystalline melting point of 238–242° C.

*Example 49*

The procedure of Example 46 was used to polymerize a 50-g. charge of styrene using 1 g. of a catalyst comprised of aluminum powder, titanium tetrachloride and dimethyl sulfoximine in a 2:1:1 molar ratio. A 10-g. yield of crystalline polystyrene was obtained. This polymer had an inherent viscosity of 2.03 and a crystalline melting point of 227–238° C.

*Example 50*

The procedure of Example 46 was employed to polymerize allylbenzene using 2 g. of a catalyst comprised of aluminum, titanium tetrachloride and ethyl benzenesulfonate in a 3:4:1 molar ratio. The yield of crystalline poly(allylbenzene) was 22%.

*Example 51*

The procedure of Example 46 was employed to polymerize vinylcyclohexane using 2 g. of catalyst composed of a 2:1:3 molar ratio of aluminum, titanium tetrachloride and diethyl sulfate. A 19% yield of highly crystalline poly(vinylcyclohexane) having an inherent viscosity of 1.49 was obtained.

*Example 52*

The procedure of Example 46 was employed to polymerize butadiene using a 1:3:1 molar ratio of aluminum powder, titanium tetrachloride and N,N-dimethylbenzenesulfonamide. From 50 g. of butadiene monomer, a 13-g. yield of polybutadiene of inherent viscosity 1.35 was obtained.

*Example 53*

In a nitrogen-filled dry box, a 7-oz. tapered pressure bottle was charged in order with 40 ml. of dry benzene, 20 g. of 4-methyl-1-pentene and 1 g. of a catalyst consisting of aluminum powder, titanium tetrachloride and dihexyl sulfoximine in a molar ratio of 2:1:2. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 8.1 g. and melted at 196–202° C.

Thus, by means of this invention polyolefins, such as polyethylene, polypropylene and polymers of higher molecular weight hydrocarbons, are readily produced using a catalyst combination whose activity, based on the knowledge of the art, could not have been predicted. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. In the polymerization of α-olefinic hydrocarbons containing 3 to 10 carbon atoms to solid crystalline polymer the improvement which comprises catalyzing the polymerization with a catalytic mixture comprising (1) a compound selected from the group consisting of halides and lower alkoxides of a transition metal selected from the group consisting of titanium, zirconium, vanadium, chromium and molybdenum; (2) an organic sulfur compound having one of the following formulas: $(R)_2SO_n$, $(R)_2NSO_2R$ and $(R)_2S(O)NH$ wherein R is a hydrocarbon radical selected from the group consisting of alkyl radicals containing 1–8 carbon atoms, phenyl and lower alkyl phenyl and $n$ is an integer of 1–4, and (3) a component selected from the group consisting of the following: (a) a metal from groups IA, II and IIIA of the periodic table, alkyl and hydride derivatives of the metals in groups IA, II and IIIA of the periodic table and complex metal hydrides of aluminum and alkali metal; (b) organo-aluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide the molar ratio of catalyst component 3 to organic sulfur compound being within the range of 10:1 to 1:5.

2. In the process for polymerizing propylene to solid crystalline polymer, the improvement which comprises catalyzing the polymerization in the presence of a catalyst comprising (1) a compound selected from the group consisting of halides and lower alkoxides of a transition metal selected from the group consisting of titanium, zirconium, vanadium, chromium and molybdenum; (2) an organic sulfur compound having one of the following formulas: $(R)_2SO_n$, $(R)_2NSO_2R$ and $(R)_2S(O)NH$ wherein R is a hydrocarbon radical selected from the group consisting of alkyl radicals containing 1–8 carbon atoms, phenyl and lower alkyl phenyl and $n$ is an integer of 1–4, and (3) a component selected from the groups consisting of the following: (a) a metal from groups IA, II and IIIA of the periodic table, alkyl and hydride derivatives of the metals in groups IA, II and IIIA of the periodic table and complex metal hydrides of aluminum and alkali metal: (b) organo-aluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide the molar ratio of catalyst component 3 to organic sulfur compound being within the range of 10:1 to 1:5.

3. The process which comprises polymerizing propylene to solid high molecular weight polymer in the presence of a catalyst comprising ethyl aluminum dichloride, titanium trichloride and dimethyl sulfoxide the molar ratio of ethyl aluminum dichloride to dimethyl sulfoxide being within the range of 10:1 to 1:5.

4. The process which comprises polymerizing propylene in the presence of a catalyst comprising ethyl aluminum sesquichloride, titanium trichloride and dimethyl sulfoxide the molar ratio of ethyl aluminum sesquichloride to dimethyl sulfoxide being within the range of 10:1 to 1:5.

5. The process which comprises polymerizing propylene to solid high molecular weight polymer in the presence of a catalyst comprising triethyl aluminum, titanium tetrachloride and dimethyl sulfoximine the molar ratio of triethyl aluminum to dimethyl sulfoximine being within the range of 10:1 to 1:5.

6. The process which comprises polymerizing propylene to solid high molecular weight polymer in the presence of a catalyst comprising aluminum metal, titanium tetrachloride and dimethyl sulfoxide the molar ratio of aluminum metal to dimethyl sulfoxide being within the range of 10:1 to 1:5.

7. The process which comprises polymerizing propylene to solid high molecular weight polymer in the presence of a catalyst comprising the polymeric reaction product of aluminum and methylene bromide, titanium tetrachloride and dimethyl sulfoximine the molar ratio of polymeric reaction product of aluminum and methylene bromide to dimethyl sulfoximine being within the range of 10:1 to 1:5.

8. As a composition of matter, a catalyst for the polymerization of α-olefinic hydrocarbons containing 3 to 10 carbon atoms to solid high molecular weight polymer comprising (1) a compound selected from the group consisting of halides and lower alkoxides of a transition metal selected from the group consisting of titanium, zirconium, vanadium, chromium and molybdenum; (2) an organic sulfur compound having one of the following formulas: $(R)_2SO_n$, $(R)_2NSO_2R$ and $(R)_2S(O)NH$ wherein R is a hydrocarbon radical selected from the group consisting of alkyl radicals containing 1–8 carbon atoms, phenyl and lower alkyl phenyl and $n$ is an integer of 1–4, and (3) a component selected from the group consisting of the following: (a) a metal from groups IA, II and IIIA of the periodic table, alkyl and hydride derivatives of the metals in groups IA, II and IIIA of the periodic table and complex metal hydrides of aluminum and alkali metal; (b) organo-aluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide the molar ratio of catalyst component 3 to organic sulfur compound being within the range of 10:1 to 1:5.

9. As a composition of matter, a catalyst for the polymerization of olefinic hydrocarbons to solid high molecular weight polymer comprising ethyl aluminum sesquichloride, titanium trichloride and dimethyl sulfoxide the molar ratio of ethyl aluminum sesquichloride to dimethyl sulfoxide being within the range of 10:1 to 1:5.

10. As a composition of matter, a catalyst for the polymerization of olefinic hydrocarbons to solid high molecular weight polymer comprising triethyl aluminum, titanium tetrachloride and dimethyl sulfoximine the molar ratio of triethyl aluminum to dimethyl sulfoximine being within the range of 10:1 to 1:5.

11. As a composition of matter, a catalyst for the polymerization of olefinic hydrocarbons to solid high molecular weight polymer comprising aluminum metal, titanium tetrachloride and dimethyl sulfoxide the molar ratio of aluminum metal to dimethyl sulfoxide being within the range of 10:1 to 1:5.

12. As a composition of matter, a catalyst for the polymerization of olefinic hydrocarbons to solid high molecular weight polymer comprising the polymeric reaction product of aluminum and methylene bromide, titanium tetrachloride and dimethyl sulfoximine the molar ratio of polymeric reaction product of aluminum to dimethyl sulfoximine being within the range of 10:1 to 1:5.

13. As a composition of matter, a catalyst for the polymerization of olefinic hydrocarbons to solid high molecular weight polymer comprising ethyl aluminum dichloride, titanium trichloride and dimethyl sulfoxide the molar ratio of ethyl aluminum dichloride to dimethyl sulfoxide being within the range of 10:1 to 1:5.

References Cited in the file of this patent

UNITED STATES PATENTS

| | | |
|---|---|---|
| 2,833,755 | Coover | May 6, 1958 |
| 2,843,577 | Friedlander | July 15, 1958 |
| 2,862,917 | Anderson et al. | Dec. 2, 1958 |
| 2,874,153 | Bowman et al. | Feb. 17, 1959 |
| 2,880,199 | Jeze | Mar. 31, 1959 |
| 2,886,560 | Weber et al. | May 12, 1959 |
| 2,886,561 | Reynolds et al. | May 12, 1959 |
| 2,942,016 | Robinson et al. | June 21, 1960 |

UNITED STATES PATENT OFFICE
CERTIFICATE OF CORRECTION

Patent No. 3,026,311                          March 20, 1962

Harry W. Coover, Jr., et al.

It is hereby certified that error appears in the above numbered patent requiring correction and that the said Letters Patent should read as corrected below.

Column 16, line 36, for "bromine" read -- bromide --.

Signed and sealed this 17th day of July 1962.

(SEAL)
Attest:

ERNEST W. SWIDER
Attesting Officer

DAVID L. LADD
Commissioner of Patents